United States Patent [19]

Kawamoto et al.

[11] Patent Number: 5,083,627

[45] Date of Patent: * Jan. 28, 1992

[54] STEERING SYSTEM FOR MOTOR VEHICLE WITH STEERABLE FRONT AND REAR WHEELS

[75] Inventors: Yoshimichi Kawamoto; Takashi Kohata; Masaru Abe; Osamu Tsurumiya, all of Tochigi, Japan

[73] Assignee: Honda Giken Kogyo Kabushiki Kaisha, Tokyo, Japan

[*] Notice: The portion of the term of this patent subsequent to Jul. 3, 2007 has been disclaimed.

[21] Appl. No.: 329,250

[22] Filed: Mar. 27, 1989

Related U.S. Application Data

[63] Continuation-in-part of Ser. No. 226,070, Jul. 29, 1988, Pat. No. 4,939,653.

[30] Foreign Application Priority Data

Mar. 28, 1988 [JP] Japan .................................. 63-75353

[51] Int. Cl.⁵ .............................................. B62D 5/04
[52] U.S. Cl. ................................... 180/79.1; 180/140; 180/142; 280/91
[58] Field of Search ............... 180/140, 192, 79.1; 280/91

[56] References Cited

U.S. PATENT DOCUMENTS

| | | | |
|---|---|---|---|
| 4,645,025 | 2/1987 | Ohe et al. | 180/140 |
| 4,705,131 | 11/1987 | Shibahata et al. | 180/140 |
| 4,706,978 | 11/1987 | Ito | 280/91 |
| 4,730,686 | 3/1988 | Shimito | 180/79.1 |
| 4,834,204 | 5/1989 | Ito et al. | 180/140 |
| 4,836,319 | 6/1989 | Haseda et al. | 280/91 |
| 4,865,146 | 9/1989 | Ohe | 280/91 |
| 4,939,653 | 7/1990 | Tsurumiya et al. | 180/79.1 |

FOREIGN PATENT DOCUMENTS

| | | |
|---|---|---|
| 165706 | 12/1985 | European Pat. Off. . |
| 208173 | 1/1987 | European Pat. Off. . |
| 223256 | 5/1987 | European Pat. Off. . |
| 60-67272 | 4/1985 | Japan . |
| 247576 | 11/1986 | Japan .................... 280/91 |
| 2147555A | 5/1985 | United Kingdom . |
| 2148220A | 5/1985 | United Kingdom . |
| 2148811A | 6/1985 | United Kingdom . |
| 2153311A | 8/1985 | United Kingdom . |
| 2153762A | 8/1985 | United Kingdom . |
| 2163394A | 2/1986 | United Kingdom . |

Primary Examiner—Mitchell J. Hill
Assistant Examiner—Donn McGrehan
Attorney, Agent, or Firm—Irving M. Weiner; Joseph P. Carrier; Pamela S. Burt

[57] ABSTRACT

A steering system for a motor vehicle having front road wheels and rear road wheels which are steerable includes a rear wheel steering mechanism for steering the rear road wheels based on a vehicle speed and a front wheel steered angle. The rear wheel steering mechanism, has a correcting mechanism fo varying a rear wheel steering force dependent on the vehicle speed.

11 Claims, 3 Drawing Sheets

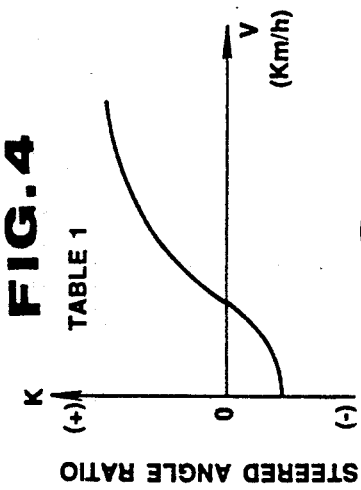
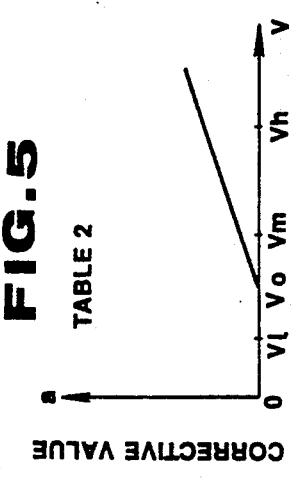
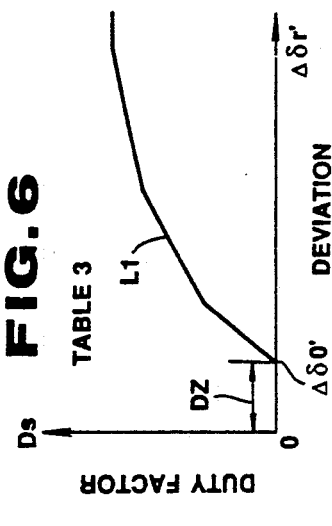
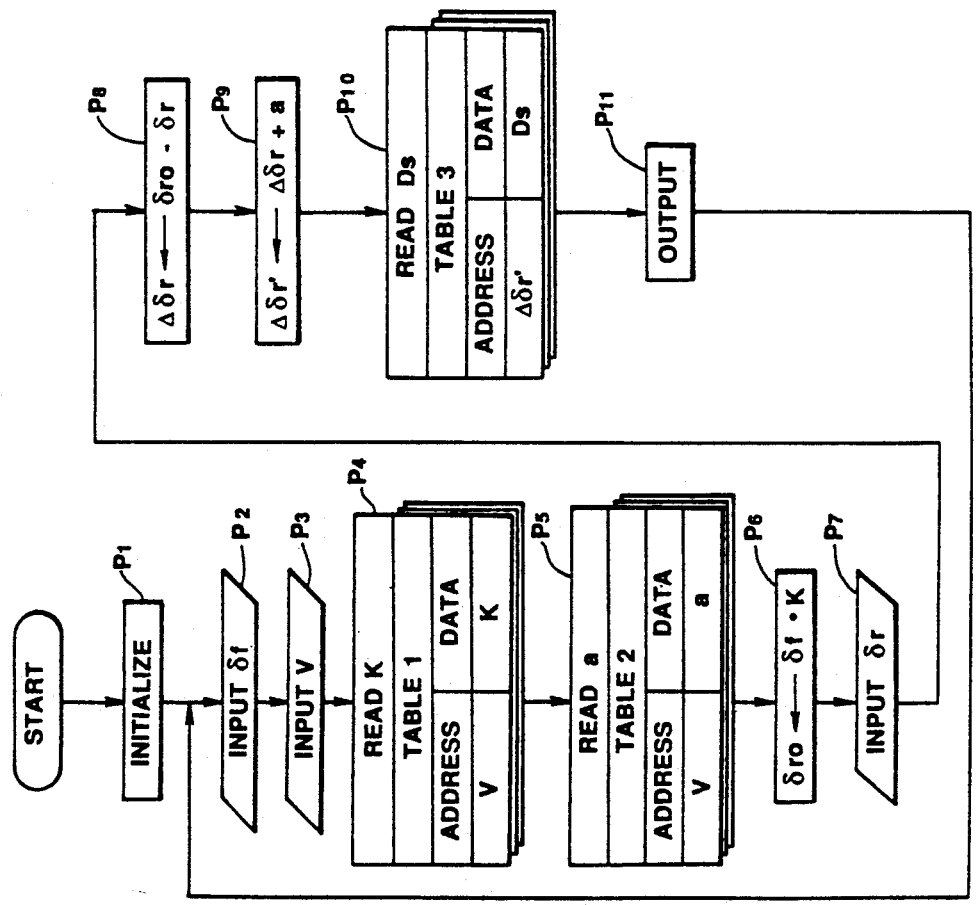

STEERING SYSTEM FOR MOTOR VEHICLE WITH STEERABLE FRONT AND REAR WHEELS

This application is a continuation-in-part of related, copending U.S. patent application Ser. No. 07/226,070 filed 7-29-88, now U.S. Pat. No. 4,939,653 issued July 3, 1990.

BACKGROUND OF THE INVENTION

1. Field of the Invention

The present invention relates to a steering system for use in a motor vehicle having steerable front and rear road wheels.

2. Description of the Relevant Art

Applicant has previously disclosed a steering system for use in a motor vehicle having steerable front and rear road wheels in Japanese Patent Application No. 62-189705. In the disclosed steering system, a front wheel steered angle $\delta f$ and a vehicle speed V are detected, and a rear wheel objective steered angle $\delta ro$ is determined from the detected steered angle $\delta f$ and the vehicle speed V. Then, the rear wheels are turned through the rear wheel objective steered angle $\delta ro$. When the motor vehicle with steerable front and rear road wheels makes a turning motion at a high speed, the rear road wheels are turned in the same direction as the front road wheels to increase a rear wheel steered angle $\delta r$, thus increasing a slip angle thereof. Therefore, a cornering force produced by the tires of the rear road wheels is increased for increased vehicle stability.

With the proposed steering system, in order to give the driver a better steering feeling, a change in a steering variable such as a steering speed Ns or the like is detected to predict the intention of the driver, and the rear wheel steered angle $\delta r$ is adjusted according to the rate of change of the steering variable. Consequently, a deviation that the driver may feel in the steering operation can be compensated for.

In the motor vehicle of the above type, both front and rear road wheels are turned to cause the tires thereof to produce cornering forces. Therefore, a lateral acceleration (lateral G) and a yawing moment are generated immediately in response to the turning of the steering wheel. The turning behavior of the motor vehicle is governed by the lateral acceleration and the yawing moment, and so is the steering feeling which the driver has. Particularly, the steering feeling is strongly affected by a time delay (hereinafter referred to as a lateral G phase delay) occurring after the steering wheel is turned and until the lateral G is generated. If the lateral G phase delay is large, the response of the motor vehicle to the steering action initiated by the driver becomes poor, failing to give the driver a desirable steering feeling. In order to achieve a better steering feeling, therefore, it is desirable that the lateral G phase delay be adjusted dependent on the vehicle speed, particularly be reduced in a high vehicle speed range.

The present invention has been made in view of the aforesaid desideratum in the previously disclosed steering system for use in a motor vehicle having steerable front and rear road wheels.

SUMMARY OF THE INVENTION

It is an object of the present invention to provide a steering system for use in a motor vehicle with steerable front and rear road wheels, which steering system can reduce a lateral G phase delay in a high-speed range to increase the response of the motor vehicle to a steering action, and which increases the lateral G phase delay in medium- and low-speed range to allow yawing to be easily developed for giving the driver of the motor vehicle a better steering feeling.

To achieve the above object, there is provided in accordance with the present invention a steering system for a motor vehicle having front road wheels and rear road wheels which are steerable by a steering wheel, the steering system comprising: vehicle speed detecting means for detecting a vehicle speed of the motor vehicle; front wheel steered angle detecting means for detecting a front wheel steered angle of the front road wheels; and rear wheel steering means for steering the rear road wheels based on the vehicle speed detected by the vehicle speed detecting means and the front wheel steered angle detected by the front wheel steered angle detecting means, the rear wheel steering means having correcting means for varying a steering force to steer the rear road wheels, dependent on the vehicle speed.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a flowchart of a control sequence executed by an MCU in the controller;

FIG. 4 is a graph showing a steered angle ratio plotted against a vehicle speed;

FIG. 5 is a graph showing a corrective value plotted against a vehicle speed;

FIG. 6 is a graph showing a duty factor plotted against a deviation between a rear wheel objective steered angle and a rear wheel actual steered angle; and FIG. 7 is a block diagram of the functions of the steering system.

DETAILED DESCRIPTION OF THE PREFERRED EMBODIMENT

Figure 1:
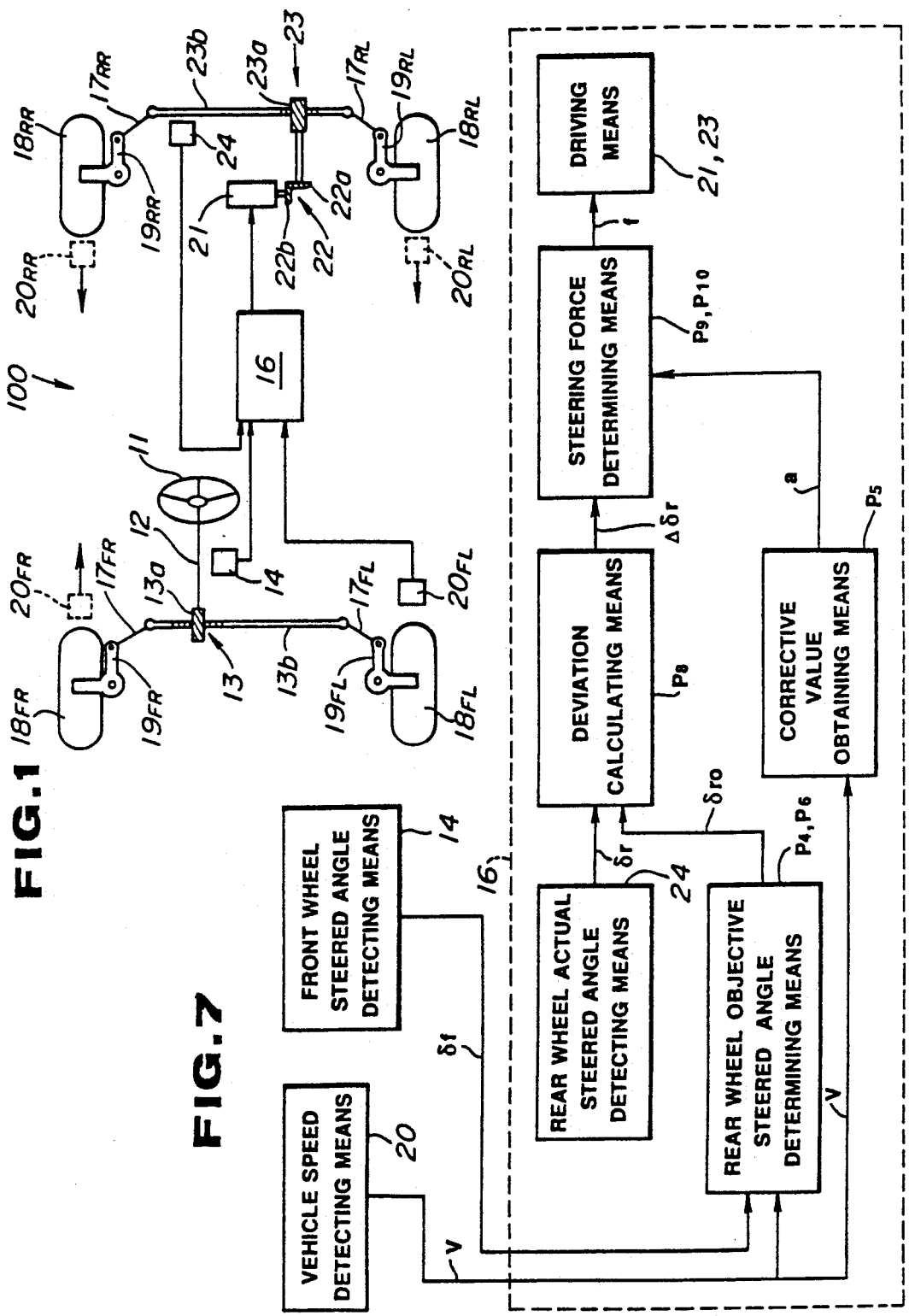
FIG. 1 is a schematic plan view of a steering system for a motor vehicle with steerable front and rear road wheels in accordance with a preferred embodiment of the present invention.
Figure 2:
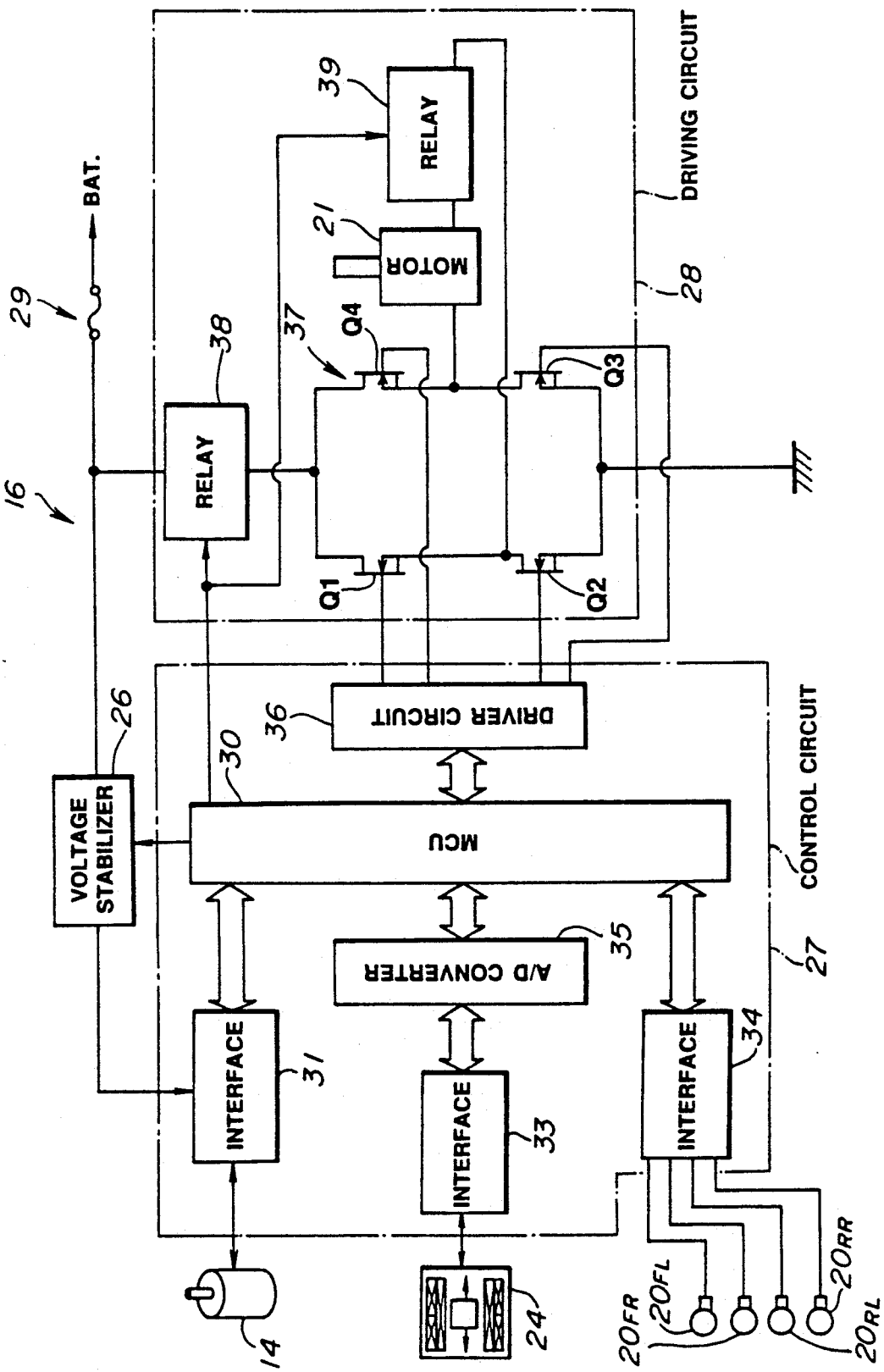
FIG. 2 is a block diagram of a controller of the steering system.

FIG. 1 shows a steering system, generally designated by the reference numeral 100, incorporated in a motor vehicle having steerable front and rear road wheels. The steering system 100 has a steering wheel 11 coupled to a rack-and-pinion front wheel steering gear mechanism 13 through a steering shaft 12. The steering shaft 12 is associated with a steered angle sensor 14 for detecting a steered angle $\theta s$ of the steering wheel 11. The steered angle sensor 14 comprises an encoder (not shown) and is electrically connected to a controller 16 (described later) for applying a detected signal indicative of a steered angle $\theta s$ to the controller 16. Note, the steered angle corresponds to a front wheel steered angle $\delta f$ because the steering shaft 12 is coupled to the rack 13b. The front wheel steering gear mechanism 13 comprises a pinion gear 13a rotatable with the steering shaft 12 and a rack 13b meshing with the pinion gear 13a. The rack 13b has opposite ends operatively coupled to knuckle arms 19FL, 19FR of a pair of laterally spaced front road wheels 18FL, 18FR through respective steering linkages such as front tie rods 17FL, 17FR. A vehicle speed sensor 20FL is associated with the front road wheels 18FL and electrically connected to the controller 16. As shown in FIGS. 1 and 2, other road wheels 18FR, 18RL, 18RR are also associated with respective vehicle speed sensors 20FR, 20RL, 20RR that are electrically connected to the controller 16.

The steering system 100 further includes an electric motor 21 electrically coupled to the controller 16 and having an output shaft operatively connected to a rack-and-pinion rear wheel steering gear mechanism 23 through a bevel gear mechanism 22. The rear wheel steering gear mechanism 23 has a pinion gear 23a and a rack 23b meshing with the pinion gear 23a. The rack 23b has opposite ends operatively coupled to knuckle arms 19RL, 19RR of the laterally spaced rear road wheels 18RL, 18RR through respective steering linkages such as rear tie rods 17RL, 17RR. The bevel gear mechanism 22 has a bevel gear 22a rotatable with the pinion gear 23a of the rear wheel steering gear mechanism 23 and a bevel gear 22b fixed to the output shaft of the motor 21. The rear wheel steering gear mechanism 23 is associated with a rear wheel steered angle sensor 24 for detecting a steered angle δr of the rear road wheels 18RL, 18RR by detecting the amount of axial movement of the rack 23b, i.e., the distance by which the rack 23b is axially moved. The rear wheel steered angle sensor 24 comprises, for example, a differential transformer and is electrically joined to the controller 16.

As shown in FIG. 2, the controller 16 has a voltage stabilizer 26, a control circuit 27, and a driving circuit 28. The voltage stabilizer 26 is connected to a vehicle-mounted battery BAT through a fuse 29 for supplying electric power of a constant voltage to the control circuit 27.

The control circuit 27 comprises a microcomputer unit (hereinafter referred to as an "MCU") 30, an interface 31 connected to the steered angle sensor 14, an interface 33 connected to the rear wheel steered angle sensor 24, an interface 34 connected to the vehicle speed sensors 20FL, 20FR, 20RL, 20RR, an A/D converter 35, and a driver circuit 36. A detected signal from the steered angle sensor 14, a detected signal from the rear wheel steered angle sensor 24, and detected signals from the vehicle speed sensors 20FL, 20FR, 20RL, 20RR are applied to the MCU 30 respectively through the interface 31, the interface 33 and the A/D converter 35, and the interface 34. The A/D converter 35 converts the signal from the interface 33 to a digital signal which is then applied to the MCU 30. The MCU 30 processes the applied detected signals according to a control program stored in a ROM and produces a control signal indicative of the direction in which the motor 21 is to be energized, and another control signal indicative of a duty factor Ds of a voltage Va, these signals being applied to the driver circuit 36. The driver circuit 36 is connected to the gates of four FETs Q1, Q2, Q3, Q4 of a switching circuit 37 in the driving circuit 28. The driver circuit 36 produces PWM (Pulse Width Modulated) signals from the control signals from the MCU 30 and applies these PWM signals to the gates of the FETs Q1, Q2, Q3, Q4.

The driving circuit 28 has the switching circuit 37 which comprises a bridge of the FETs Q1, Q2, Q3, Q4, and two relays 38, 39. In the switching circuit 37, the FETs Q1, Q4 have respective drains connected to the battery BAT through the relay 38 and the fuse 29, and respective sources connected to the drains, respectively, of the FETs Q2, Q3 which have sources grounded. The motor 21 and the relay 39 are connected in series between the source and drain of the FETs Q1, Q2 and the source and drain of the FETs Q4, Q3. The PWM signals from the driver circuit 36 are applied to the gates of the FETs Q1, Q2, Q3, Q4 for selectively energizing a set of the FETs Q1, Q3 and a set of the FETs Q2, Q4 to pass an electric current through the motor 21 in the direction indicated by the control signal and with the duty factor indicated by the PWM signals. The relays 38, 39 have solenoids connected to the MCU 30 and contacts movable by the solenoids. The contacts are actuatable into and out of contact with each other to close and open the relays 38, 39 in response to an output signal from the MCU 30.

Operation of the steering system 100 will be described below with reference to FIG. 3.

The MCU 30 of the steering system 100 executes a series of processing steps according to the flowchart of FIG. 3 to control the motor 21.

First, an ignition key to the motor vehicle is turned to turn on a key switch (not shown) to supply electric power to the MCU 30 and other circuits to start the control sequence. In a step P1, the MCU 30 is initialized by addressing its register, for example.

A front wheel steered angle δf is indirectly read from the detected signal from the steered angle sensor 14 in a step P2. Then, a vehicle speed V is read from the detected signal from the vehicle speed sensors 20FL-etc. in a step P3.

In a step P4, a steered angle ratio K is determined from a table 1 shown in FIG. 4 by using the vehicle speed V as an address. The steered angle ratio K represents a ratio δr/δf of the rear wheel steered angle δr to the front wheel steered angle δf, and has a negative value (which means that the front and rear road wheels are steered in opposite directions) in a low-vehicle-speed range, and a positive value (which means that the front and rear road wheels are steered in the same direction) in a high-vehicle-speed range.

In a step P5, a corrective value a is determined from a table 2 shown in FIG. 5 by using the vehicle speed V as an address. The corrective value a is represented by a linear function which progressively increases linearly from 0 [zero] in a vehicle speed range higher than a certain vehicle speed.

Then, in step P6, the steered angle δf of the front road wheels 18FL, 18FR is multiplied by the steered angle ratio K to obtain a target or objective steered angle δro for the rear road wheels 18RL, 18RR.

Thereafter, an actual steered angle δr of the rear road wheels 18RL, 18RR is read from the detected signal from the rear wheel steered angle sensor 24 in a step P7.

In a step P8, the actual steered angle δr is subtracted from the objective steered angle δro to produce a deviation Δδr therebetween.

In a step P9, the corrective value a is added to the deviation Δδr to produce a corrected deviation Δδr'.

In a step P10, a duty factor Ds of a current Im to be passed through the motor 21, i.e., a steering force f, is determined from a table 3 shown in FIG. 6 by using the corrected deviation Δδr' as an address. As can be understood from FIG. 6, the duty factor Ds indicated by a characteristic curve L1 has a dead zone DZ in a lower deviation range smaller than a predetermined value Δδ0' and progressively increases substantially linearly in a higher deviation range larger than the predetermined value Δδ0'. The dead zone DZ itself is relatively wide. When the corrected deviation $\Delta\delta r'$ is in the dead zone DZ, the duty factor DZ is zero and hence the motor 21 is not energized. Typical low, medium, and high vehicle speeds are represented respectively by Vl, Vm, Vh in FIG. 5.

A signal representative of the duty factor Ds is supplied to the driver circuit 36 in a step P11. The driver circuit 36 applies PWM signals corresponding to the input signal Ds to the gates of the pair of FETs Q1, Q3 or the pair of FETs Q2, Q4 of the switching circuit 37. Therefore, the current Im having the duty factor Ds is passed through the motor 21 in the direction corresponding to the direction in which the rear road wheels 18RL, 18RR are to be steered. As a result, the rear road wheels 18RL, 18RR are steered with the steering force f dependent on the duty factor Ds.

According to the control process illustrated in FIG. 3, the rear wheel objective steered angle $\delta ro$ is determined from the front wheel steered angle $\delta f$ and the vehicle speed V. Then the deviation $\Delta\delta r$ between the objective steered angle $\delta ro$ and the rear wheel actual steered angle $\delta r$ is calculated, after which the deviation $\Delta\delta r$ is corrected so as to increase in substantial proportion to the vehicle speed V. The rear wheel steering force f is determined in substantial proportion to the corrected deviation $\Delta\delta r'$. The rear road wheels 18RL, 18RR are steered through the objective steered angle $\delta ro$.

In the high-vehicle-speed range higher than the predetermined vehicle speed VO, the deviation $\Delta\delta r$ between the objective steered angle $\delta ro$ and the actual steered angle $\delta r$ of the rear road wheels is corrected so as to increase. The duty factor Ds of the current Im to be passed through the motor 21 is then determined substantially proportionally based on the increased deviation $\Delta\delta r'$. The width of the dead zone DZ is also effectively corrected by correcting the deviation $\Delta\delta r$.

It is assumed that the correcting step P9 was not effected and the duty factor Ds was determined from the table 3 of FIG. 6 based on the deviation $\Delta\delta r$ produced in the step P8. The dead zone DZ should be of a certain or finite width to prevent hunting in view of ripples or noise contained in the output signals from the sensors and also in view of desired system stability. With a dead zone DZ of a large width, however, the motor 21 would not be energized even if the deviation $\Delta\delta r$ is of a certain large value during an initial stage of the steering action of the steering wheel. Therefore, during the initial stage of the steering action, the rear road wheels would not be steered, and the lateral G phase delay would be increased. Where the dead zone DZ is reduced, the motor 21 would be quickly energized in the initial stage of the steering action, thus reducing the lateral G phase delay.

By effecting the processing step P9, however, the corrected deviation $\Delta\delta r'$ increases with the vehicle speed V in the vehicle speed range higher than the predetermined vehicle speed VO. This processing is equivalent to moving the characteristic curve L1 in a direction to reduce the dead zone DZ as the vehicle speed V goes higher.

When the vehicle speed V is a high speed Vh (FIG. 5) in the high speed range, the steering force f for the rear road wheels 18RL, 18RR is increased. Therefore, during the steering operation including the initial stage thereof, the speed at which the rear road wheels 18RL, 18RR are steered is increased. As a result, the lateral G phase delay is reduced, and the response of the rear road wheels to the steering action is increased.

When the vehicle speed V is a medium speed Vm (FIG. 5) in the medium speed range, the dead zone DZ is effectively of an appropriate width, and the rear wheel steering force f is smaller than when the vehicle speed V is in the high speed range. As a consequence, the lateral G phase delay is maintained at an adequate level, giving the motor vehicle desired yawing, i.e., the ability to change its course of travel with ease.

When the vehicle speed V is a low speed Vl (FIG. 5) in the low speed range, since the corrective value a is zero, the duty factor Ds is determined based on the uncorrected deviation $\Delta\delta r$ according to the characteristic curve L1 shown in FIG. 6, and the dead zone DZ is not reduced. Consequently, the rear wheel steering force f is generally smaller than when the vehicle speed V is in the medium speed range. As a result, the lateral G phase delay is larger than when the vehicle speed V is in the medium speed range. The motor vehicle is given desired yawing characteristics, i.e., can easily change its course of travel, and hunting is prevented from occurring in steering the rear road wheels.

With the steering system 100 according to the present invention, the force f for steering the rear road wheels is varied dependent on the vehicle speed V such that the steering force f will be basically increased in the high speed range. Accordingly, the lateral G phase delay is reduced in the high speed range, thereby increasing the response of the rear road wheels to the steering action. In the medium speed range, the lateral G phase delay is kept at an appropriate level, giving the motor vehicle a desired yawing tendency, i.e., the ability to make a easy turn. In the low speed range, the motor vehicle is given desired yawing characteristics, i.e., can make easy turns, and hunting in steering the rear road wheels is prevented from taking place.

According to the present invention, therefore, the driver of the motor vehicle is given a good steering feeling throughout all vehicle speed ranges.

Instead of determining the corrective value a and executing the step P9, a corrective value which has a unit value ($-1$) in the low speed range and increases as the vehicle speed increases may be determined, and the deviation $\Delta\delta r$ may be corrected by being multiplied by the corrective value thus determined.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. A steering system for a motor vehicle having front road wheels and rear road wheels which are steerable by a steering wheel, said steering system comprising:
   vehicle speed detecting means for detecting a vehicle speed of the motor vehicle;
   front wheel steered angle detecting means for detecting a front wheel steered angle of the front road wheels;
   rear wheel steering means for steering the rear road wheels based on the vehicle speed detected by said vehicle speed detecting means and the front wheel steered angle detected by said front wheel steered angle detecting means; and said rear wheel steering means having correcting means for increasing a steering force to steer the rear road wheels, as the vehicle speed increases.

2. A steering system for a motor vehicle having front road wheels, rear road wheels, a steering wheel, a front wheel steering device for steering the front road wheels through an angle corresponding to a steered angle of the steering wheel, and a rear wheel steering device for steering the rear road wheels dependent on the steered angle of the front road wheels, said rear wheel steering device comprising:

first detecting means for detecting the steered angle of the front road wheels;

second detecting means for detecting vehicle speed of the motor vehicle;

a rear wheel steering mechanism for steering the rear road wheels;

third detecting means for detecting an actual steered angle of the rear road wheels;

determining means for determining an objective steered angle of the rear road wheels based on the steered angle of the front road wheels detected by said first detecting means and the vehicle speed detected by said second detecting means;

deviation producing means for producing a deviation between said objective steered angle of the rear road wheels and the actual steered angle of the rear road wheels detected by said third detecting means;

correcting means for producing a corrective value based on the vehicle speed detected by said second detecting means and for correcting said deviation with said corrective value;

steering force determining means for determining a steering force to be applied to the rear road wheels based on the corrected deviation; and drive control means for driving said rear wheel steering mechanism to steer the rear road wheels through said objective steered angle with the determined steering force;

said steering force determining means determines said steering force such that the steering force increases as the corrected deviation increases.

3. A steering system according to claim 2, wherein said correcting means produces said corrective value such that the corrective value increases as the vehicle speed increases, and said correcting means having means for correcting said deviation by adding said corrective value to said deviation.

4. A steering system according to claim 3, wherein said corrective value produced by said correcting means has a value of zero in a vehicle speed range lower than a prescribed vehicle speed.

5. A steering system according to claim 3, wherein said steering force determining means determines said steering force such that the steering force has a dead zone of a predetermined value with respect to the corrected deviation.

6. A method of controlling the steering operation of rear road wheels of a motor vehicle having steerable front and rear road wheels, said method comprising the steps of:

detecting a vehicle speed of the motor vehicle;

detecting a front wheel steered angle of the front road wheels;

determining an objective steered angle for the rear road wheels based on the detected steered angle of the front road wheels and the detected vehicle speed;

detecting an actual steered angle of the rear road wheels;

determining a deviation between said objective steered angle of the rear road wheels and the detected, actual steered angle;

producing a corrective value based on the detected vehicle speed and correcting said deviation with said corrective value;

determining a steering force to be applied to the rear road wheels based on the corrected deviation; and steering the rear road wheels through said objective steered angle with said determined steering force;

said steering force is determined such that it increases as the corrected deviation increases.

7. A method according to claim 6, wherein said corrective value is produced such that it increases as the detected vehicle speed increases.

8. A method according to claim 7, wherein said corrective value has a value of zero in a vehicle speed range lower than a prescribed vehicle speed.

9. A method according to claim 7, wherein said steering force is determined such that the steering force has a dead zone of a predetermined value with respect to the corrected deviation.

10. A method according to claim 9, wherein said predetermined value of said dead zone is effectively decreased as said corrected deviation increases.

11. A steering system for a motor vehicle having front road wheels and rear road wheels which are steerable by a steering wheel, said steering system comprising:

vehicle speed detecting means for detecting a vehicle speed of the motor vehicle;

front wheel steered angle detecting means for detecting a front wheel steered angle of the front road wheels;

rear wheel steering means for steering the rear road wheels based on the vehicle speed detected by said vehicle speed detecting means and the front wheel steered angle detected by said front wheel steered angle detecting means; and said rear wheel steering means having correcting means for varying a steering force to steer the rear road wheels dependent on the vehicle speed such that a value of a dead zone associated with said steering force is effectively decreased in a higher speed range.

* * * * *

UNITED STATES PATENT AND TRADEMARK OFFICE
CERTIFICATE OF CORRECTION

PATENT NO. : 5,083,627
DATED : January 28, 1992
INVENTOR(S) : Yoshimichi Kawamoto; Takashi Kohata; Masaru Abe.

It is certified that error appears in the above-identified patent and that said Letters Patent is hereby corrected as shown below:

In The Abstract, line 6, change "fo" to --for--.

Column 1, line 60, change "desideraturn" to --desideratum--.

Column 4, line 29, change "20FL-etc." to --20FL, etc.--.

Column 6, line 44, change "(-1)" to --(=1).

Signed and Sealed this

Twenty-seventh Day of April, 1993

Attest:

MICHAEL K. KIRK

Attesting Officer

Acting Commissioner of Patents and Trademarks